(12) United States Patent
Schmitz

(10) Patent No.: US 8,100,409 B2
(45) Date of Patent: Jan. 24, 2012

(54) METALLIC CYLINDER HEAD GASKET

(75) Inventor: Joerg Schmitz, Walled Lake, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 858 days.

(21) Appl. No.: 12/023,339

(22) Filed: Jan. 31, 2008

(65) Prior Publication Data

US 2009/0066036 A1 Mar. 12, 2009

Related U.S. Application Data

(60) Provisional application No. 60/971,307, filed on Sep. 11, 2007.

(51) Int. Cl.
*F16J 15/08* (2006.01)
(52) U.S. Cl. .................. 277/593; 277/592; 277/594
(58) Field of Classification Search ........... 277/592–595
See application file for complete search history.

(56) References Cited

U.S. PATENT DOCUMENTS

| | | | |
|---|---|---|---|
| 4,121,846 A | 10/1978 | Skrycki | |
| 6,357,758 B1 | 3/2002 | Zurfluh | |
| 6,550,782 B2 * | 4/2003 | Okazaki et al. | 277/592 |
| 6,682,079 B2 | 1/2004 | Reisel et al. | |
| 6,722,662 B2 | 4/2004 | Heilig et al. | |
| 7,048,279 B2 | 5/2006 | Gernand et al. | |
| 2005/0189724 A1 * | 9/2005 | Schmitz | 277/592 |

FOREIGN PATENT DOCUMENTS

| | | |
|---|---|---|
| JP | 63-048060 U | 2/1988 |
| JP | 06-034051 A | 2/1994 |
| JP | 06235464 A * | 8/1994 |

* cited by examiner

*Primary Examiner* — Gilbert Lee
(74) *Attorney, Agent, or Firm* — Robert L. Stearns; Dickinson Wright PLLC

(57) ABSTRACT

A metal gasket has at least two metal layers having an aligned fluid-conveying opening. One of the metal layers includes a carrier layer and an active layer. The active layer has a raised metal sealing bead circumscribing the opening. The carrier layer and the active layer are at least partially coplanar and are spaced from one another within the plane by at least one cut-out region between the carrier layer and the active layer. The cut-out region allows the active layer to move out of the plane of the carrier layer, and thus, the active layer is able to self-adjust for sealing engagement between opposing surfaces in assembly and during use.

9 Claims, 2 Drawing Sheets

METALLIC CYLINDER HEAD GASKET

This application claims priority to U.S. Provisional Application Ser. No. 60/971,307, filed Sep. 11, 2007, and is incorporated herein by reference.

BACKGROUND OF THE INVENTION

1. Technical Field

This invention relates generally to internal combustion engines, and more particularly to metallic cylinder head gaskets therefor.

2. Related Art

Metallic gaskets are widely used in internal engine applications to establish a seal between opposing surfaces of a cylinder head and an engine block. The seal is typically created to prevent leakage of fluids such as combustion gases, oil, coolant, and the like. The gaskets are typically constructed from several continuous planar sheets or layers of metal formed with the appropriate openings to accommodate cylinder bores, fluid flow between the cylinder block and engine block and fasteners joining the cylinder block to the engine block. The layers are laminated to provide a resiliently compressible, multi-layer structure. At least one outer layer is typically embossed to define annular beads extending outwardly from the plane of the layer, with the beads being formed to circumvent the cylinder bores. As such, when the cylinder head is fastened to the engine block, the beads are resiliently compressed between the opposing surfaces of the engine block and cylinder head to define sealing surfaces between the beads and the respective surfaces to prevent leakage of the associated fluid or gas.

In application, the ability to establish a seal about the cylinder bore openings can be complicated by varying degrees in which cylinder liners extend above a face surface of the engine block, sometimes referred to as cylinder liner overstand. As the cylinder block is fastened to the engine block, the varying degrees of cylinder liner overstand can result in the beads of the gasket being compressed axially under differing pressures from one another. In addition, if the overstand of an individual cylinder liner is nonuniform, the respective bead can be compressed in a skewed relation to the plane of the gasket and/or in a skewed relation to the remaining beads of the gasket. The difficulty of establishing a reliable seal is further complicated by movement of the individual cylinder liners in use, as is commonly experienced between compression and exhaust strokes of the respective pistons. The sealing difficulty results largely from the beads of the gasket layers being restricted in their ability to float, skew or move axially relative to one another with the individual movements of the cylinder liners. As such, the inability of the beads to follow the movements of the respective cylinder liners generally results in a fluid leak, thereby diminishing the efficiency and useful life of the engine.

SUMMARY OF THE INVENTION

A metal gasket constructed in accordance with one aspect of the invention includes at least two metal layers having an aligned fluid-conveying opening, with at least one of the metal layers comprising a carrier layer and an active layer. The active layer has a raised metal sealing bead circumscribing the opening. The carrier layer and the active layer are at least partially coplanar and are spaced from one another within the plane by at least one cut-out region between the carrier layer and the active layer. The cut-out region allows the active layer to move out of the plane of the carrier layer, and thus, the active layer is able to self-adjust for sealing engagement between opposing surfaces in assembly and during use.

Another aspect of the invention includes a multilayer metal gasket having at least two metal layers with a plurality of aligned fluid-conveying openings. At least one of the metal layers has a carrier layer with a generally planar surface and a plurality of active layers, wherein each of the active layers has a raised metal sealing bead circumscribing a separate one of the fluid conveying openings. The carrier layer and active layers are at least partially separated from one another by at least one cut-out region. The cut-out regions allow the active layers to move relative to one another and out of the plane of the carrier layer, and thus, the active layers are able to self-adjust for sealing engagement between opposing surfaces in assembly and during use.

Accordingly, metal gaskets constructed according to various aspects of the invention provide reliable sealing between opposing surfaces, even when the opposing surfaces have non-uniform heights, such as in cylinder liner applications exhibiting overstand conditions. In addition, the gaskets are constructed as unitary members, thereby making their assembly easy and economical, they are also economical in manufacture and in use, and they provide a long life in use.

BRIEF DESCRIPTION OF THE DRAWINGS

These and other features and advantages of the present invention will become more readily appreciated when considered in connection with the following detailed description of presently preferred embodiments and best mode, appended claims and accompanying drawings, wherein like features have been given like reference numerals, wherein:

DETAILED DESCRIPTION OF PRESENTLY PREFERRED EMBODIMENTS

Figure 1:
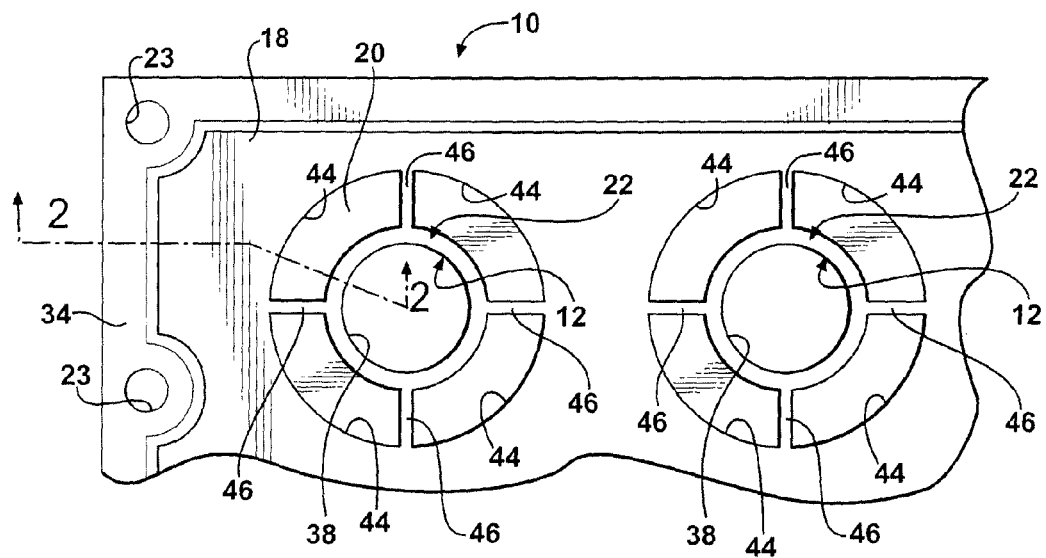
FIG. 1 is a fragmentary plan view of a metal gasket constructed according to one presently preferred embodiment of the invention.
Figure 2:
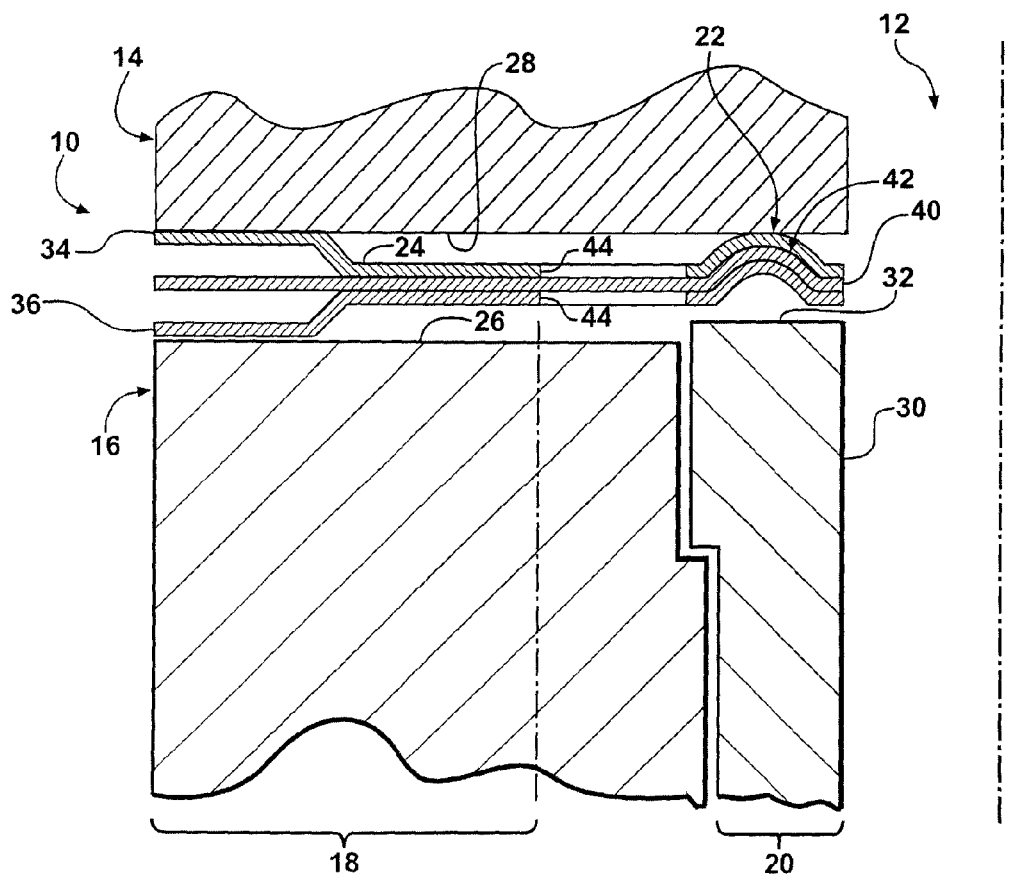
FIG. 2 is an enlarged cross-sectional view taken generally along line 2-2 of FIG. 1.

Referring in more detail to the drawings, FIGS. 1 and 2 illustrate a multilayered metallic gasket 10 constructed according to one presently preferred embodiment of the invention. The gasket 10 is particularly useful as a cylinder head gasket to create a reliable fluid tight seal about multiple cylinder bores 12 and various other fluid passages or openings extending between a cylinder head 14 and engine block 16 of an internal combustion engine. The gasket 10 has a carrier layer portion 18, referred to hereafter as carrier layer, mainly for unitizing the gasket as a one piece assembly, and an active layer portion 20, referred to hereafter as active layer, for establishing the respective seals about the various openings. To facilitate establishing a seal, the active layer 20 has at least one, and preferably a plurality of raised sealing beads 22 shaped to circumscribe the cylinder bores 12 and other openings, such as fastener openings 23, for example. The carrier layer 18 has a generally planar surface 24 adapted to be clamped between opposing surfaces 26, 28 of the cylinder head 14 and engine block 16, respectively, whereupon the active layer 20 is generally free to float or move at least partially relative to, or at least partially out of the plane of the planar surface 24 of the carrier layer 18 during assembly and while in use. Accordingly, the sealing beads 22 of the active layer 20 are able to maintain a substantially fluid tight seal about the respective opening 12, even in conditions of varying cylinder liner overstand (this is a term of art used to signify a variance in height between a cylinder liner 30 and the upper surface 26 of the engine block 16, wherein an upper surface 32 or flange of the cylinder liner 30 extends above the surface 26 of the engine block 16) between the various cylinder bores 12. Not only does the gasket provide a reliable fluid-tight seal across varying cylinder liner overstands in use, but it also increases manufacturing efficiencies by allowing tolerances of the cylinder liners 30 and engine block 16 to be increased without having a detrimental affect on the operating efficiency of the engine.

Figure 5:
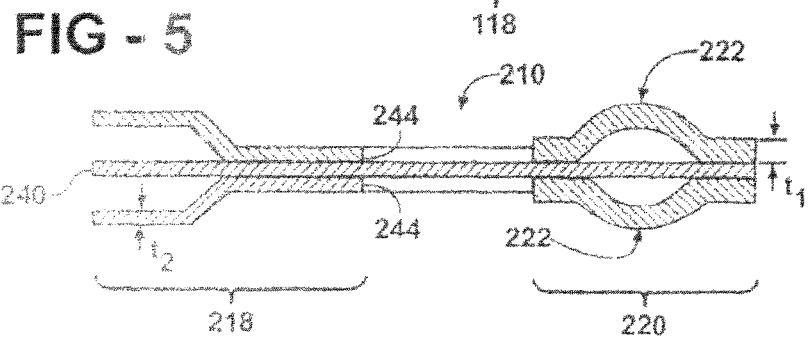

The gasket 10 has at least two metal layers 34, 36 operatively attached to one another, such as by a weld joint, stake, or suitable adhesive, with at least one, and preferably a plurality of aligned fluid-conveying openings 38 sized for concentric alignment with respective cylinder bores 12. At least one of the metal layers, and shown in FIG. 1 as both metal layers, are constructed having the carrier layer 18 and an appropriate number of active layers 20 corresponding with the number of cylinder bores being sealed. The layers 34, 36 are preferably constructed from a spring steel, however, they could be constructed from any heat treatable steel capable of providing spring-like properties. Each active layer 20 has the sealing beads 22 extending outwardly from the plane of the planar surface 24 of the carrier layer 18, wherein the sealing beads 22 of the two layers 34, 36 can be arranged to nest with one another, or the beads 22 can be formed to extend away from one another, as shown in FIG. 5. The carrier layer 18 is preferably formed having an appropriate number of fastener through openings 23 to allow the respective fasteners (not shown) to pass therethrough during assembly of the cylinder head to the engine block.

As shown in FIG. 2, the two layers 34, 36 are shown separated from one another by a midlayer 40, wherein the midlayer 40 is preferably formed from metal. The midlayer 40 can act as a spacer layer, an additional sealing enhancing layer, and/or as a deformation limiter to limit the amount of elastic deformation of the sealing beads 22 to maximize the integrity of the seal established between the opposing sealing surfaces 26, 28 of the cylinder head 14 and engine block 16. The midlayer 40 is shown here as having an additional raised sealing bead 42 arranged to nest with sealing beads 22 of the other two layers 34, 36 to enhance the sealing effectiveness of the gasket 10.

Each of the layers 34, 36 has at least one through opening 44, referred to as a cut-out region, formed between the carrier layer 18 and the active layer 20. As shown in FIG. 1, the cut-out regions 44 define a plurality of webs 46 extending between the carrier layer 18 and active layer 20 to attach the carrier layer 18 and active layer 20 in radially spaced relation to one another. The webs 46 are preferably formed as a monolithic, one piece of material with the carrier layer 18 and active layer 20, and are flexible to allow the active layer 20 to move at least partially out of the plane of the planar surface 24 of the carrier layer 18 in assembly and in use. It is contemplated that the webs 46 could be constructed as a separate piece of material from the carrier and active layers 18, 20, if desired, and thereafter attached thereto, such as via a weld joint, for example. As shown in FIG. 2, the midlayer 40 is shown extending across the cut-out regions 44, though it could be constructed having mating openings in a single operation with the outer layers 34, 36, or in a secondary operation, if desired. It should be recognized that the midlayer 40 is constructed having a suitable thickness and with suitable flexibility to allow the aforementioned movement of the active layer 20 relative to the carrier layer 18.

The cut-out regions 44 at least partially circumscribe the respective sealing bead 22, 42 and cylinder bore 12. Where two or more cut-out regions 44 are employed, the cut-out regions 44 can be spaced in any suitable circumferential relation to one another, and are preferably spaced symmetrically about the respective beads 22, 42 by the webs 46. The cut-out regions 44 preferably occupy a combined area greater than the total area of the webs 46 to maximized the ability of the active layer 20 to move relative to the plane 24 of the carrier layer 18. As such, the webs 46 are preferably constructed having a minimum width and thickness. To further promote movement of the active layer 20 relative to the plane 24 of the carrier layer 18, the cut-out regions 44 of the respective layers 34, 36, and possibly the midlayer 40, are preferably arranged in mirrored relation to one another, though they could be formed otherwise, if desired.

Accordingly, with the gasket 10 constructed as discussed above, a reliable seal can be established and maintained via the sealing beads 22, 42 about the cylinder bores 12. In assembly and in use, the sealing beads 22, 42 are able to maintain a fluid tight seal about the cylinder bores 12 by remaining in sealing engagement with the opposing surfaces 26, 28 of the cylinder head 14 and engine block 16. The seal is maintained as a result of the active layer 20 of the gasket 10 being able to float or move relative to the carrier layer 18. As such, as shown in FIG. 2, where the cylinder liners 30 extend above the surface 26 of the engine block 16, whether each cylinder liner 30 extends generally same distance above the surface 26, or different distances relative to one another and/or to the surface 26, the gasket 10 is able to accommodate the overstands independently from one another to establish and maintain a fluid tight seal. In addition, where the overstand of a cylinder liner 30 varies about its circumference, the active layer 20 is also able to float accordingly to form and maintain a fluid tight seal.

Figure 3:
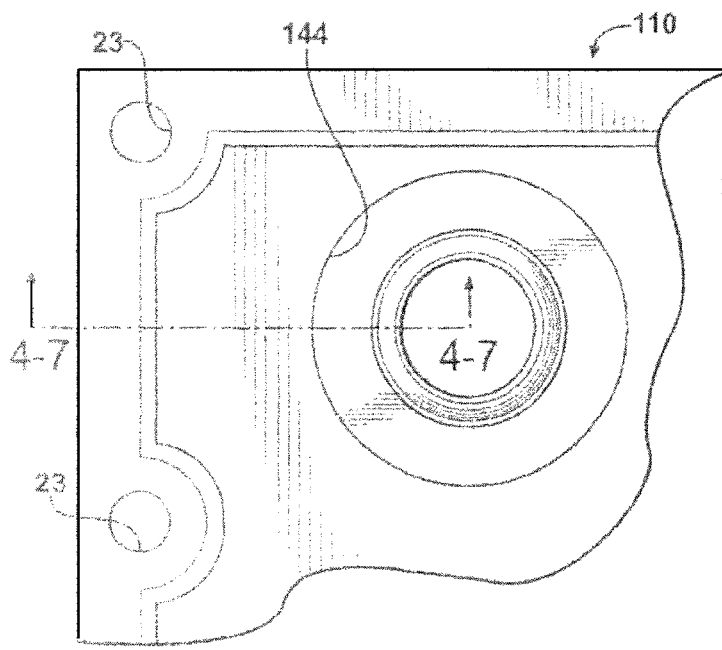
FIG. 3 is a fragmentary plan view of a metal gasket constructed according to a first alternate embodiment of the invention.
Figure 4:
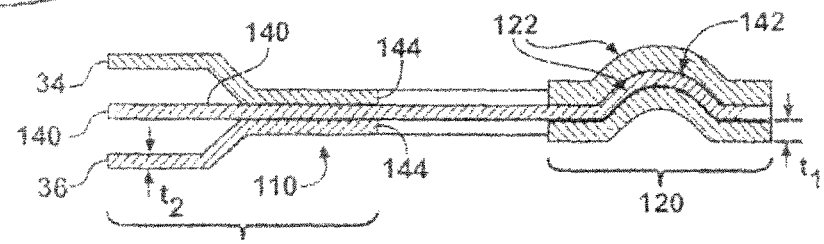
FIGS. 4-7 are fragmentary cross-sectional views taken generally along lines 4-7 of a metal gasket constructed according to further alternate embodiments of the invention.

In FIGS. 3 and 4, another embodiment of a gasket 110 constructed in accordance with the invention includes a plurality of active layers 120 that are completely separate and detached from a carrier layer 118. Each active layer 120 is separated from the carrier layer 118 by an opening or cut-out region 144 extending circumferentially therebetween. To maintain the active layers 120 in radially stationary position relative to the carrier layer 118, the active layers 120 can be attached to a midlayer 140, such as by a weld joint, a staking operation, or an adhesive, for example. Accordingly, the active layers 120 are able to freely float at least partially out of the plane of the carrier layer 118 without experiencing bias or influence from the material of the carrier layer 118, wherein the material of a midlayer 140 provides for the relative movement by flexing, as necessary. To facilitate regulating the compression loads on the gasket 110, the active layers 120 can act as a deformation limiter by being constructed from a metal having an increased thickness (t1) from a thickness (t2) of the carrier layer 118 (FIG. 4). Otherwise, the gasket 110 is the same as the gasket 10 in the embodiment discussed above, including having nested full beads 122, 142.

In FIG. 5, another embodiment of a gasket 210 constructed in accordance with the invention is shown. The gasket 210 is similar to that shown in FIG. 3, wherein a plurality of active layers 220 are completely separated from a carrier layer 218 by circumferential cut-out regions 244, however, the active layers 220 on opposite sides of a midlayer 240 have sealing beads 222 extending axially outwardly away from the midlayer 240 and from one another. In addition, the midlayer 240 is shown constructed from a metal layer having an increased thickness to act as a compression load limiter.

Figure 6:
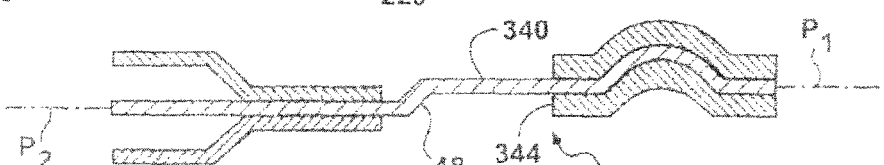

In FIG. 6, another embodiment of a gasket 310 constructed in accordance with the invention is shown. The gasket 310 is similar to the embodiment shown in FIG. 4, however, a midlayer 340 has an annular step 48 contained within a cut-out region 344 between the active and carrier layers. The step 48 defines offset, generally parallel planar regions P1, P2 and acts as a load limiter by raising one of the regions P1 axially relative to the other region P2. It should be recognized that the step 48 could be constructed having any suitable angle of inclination and height as necessary to obtain the desired resistance to compression.

Figure 7:
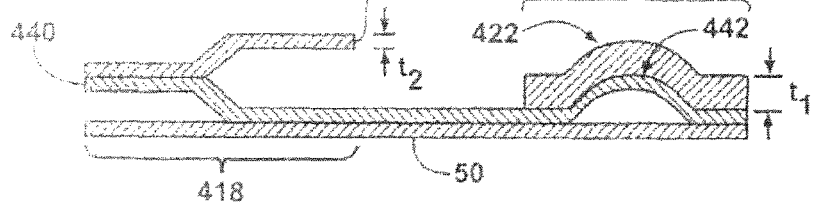

In FIG. 7, yet another embodiment of a gasket 410 constructed in accordance with the invention includes an active layer 420 that is completely separate and detached from a carrier layer 418. The active layer 420 is separated from the carrier layer 418 by a circumscribed opening or cut-out region 444. To maintain the active layer 420 in a radially stationary position relative to the carrier layer 418, the active layer 420 and carrier layer 418 can be attached to a midlayer 440, such as by a weld joint, a staking operation, or an adhesive, for example. Accordingly, the active layer 420 is able to float at least partially out of the plane of the carrier layer 418 without undue bias or influence from the carrier layer 418, such that the midlayer 440 provides the necessary relative movement by flexing. To facilitate regulating the compression loads on the gasket 410, the active layer 420 can act as a deformation limiter by being constructed from a metal having an increased thickness (t1) from a thickness (t2) of the carrier layer 418. In addition, the midlayer 440 can have a raised sealing bead 442 arranged to nest with a sealing bead 422 in the active layer 420. Further, another layer 50, represented here as being generally flat, can be attached to the opposite side of the midlayer from the active and carrier layers 420, 418.

Obviously, in light of the above teachings, many modifications and variations of the present invention are possible. It is, therefore, to be understood that within the scope of the appended claims, the invention may be practiced otherwise than as specifically described.

What is claimed is:

1. A metal gasket, comprising:
a pair of metal layers having aligned fluid-conveying openings, each of said metal layers comprising a carrier layer portion and an active layer portion being at least partially coplanar with one another, said active layer portions having a raised metal sealing bead circumscribing said opening;
wherein said carrier layer portion and said active layer portion in each metal layer are spaced from one another within the plane by at least one cut-out region, said cut-out region allowing said active layer portion to move out of the plane of said carrier layer;
each of said pair of metal layers having webs extending between said carrier layer portion and said active layer portion and attaching said carrier layer portion and said active layer portion to one another;
said cut-out regions and said webs of said pair of metal layers being arranged in mirrored relation with one another; and
another metal layer disposed between said pair of metal layers, said another metal layer extending entirely across said cut-out regions.

2. The metal gasket of claim 1 wherein said carrier layer portion and said active layer portion are spaced from one another by at least two of said cut-out regions.

3. The metal gasket of claim 2 wherein said webs are formed as one piece of material with said carrier layer portion and said active layer portion.

4. The metal gasket of claim 2 wherein said cut-out regions are spaced symmetrically about said bead.

5. The metal gasket of claim 2 wherein said cut-out regions occupy an area greater than said webs.

6. The metal gasket of claim 2 wherein said webs are flexible.

7. The metal gasket of claim 1 wherein said another metal layer has a raised metal sealing bead shaped to nest with said sealing bead of said active layer portion.

8. The metal gasket of claim 1 wherein said sealing beads on said two active layer portions extend outwardly from said another metal layer and away from one another to a pair of annular crests.

9. The metal gasket of claim 1 wherein said sealing beads on said two active layer portions nest with one another.

* * * * *